(12) United States Patent
Seong

(10) Patent No.: US 9,957,662 B2
(45) Date of Patent: May 1, 2018

(54) STAIN-RESISTANT SYNTHETIC LEATHER AND METHOD FOR MANUFACTURING SAME

(71) Applicant: Soon Kie Jung, Glen Saddle River, NJ (US)

(72) Inventor: Nak Hyun Seong, Iksan-si (KR)

(73) Assignee: Soon Kie Jung, Glen Saddle River, NJ (US)

( * ) Notice: Subject to any disclaimer, the term of this patent is extended or adjusted under 35 U.S.C. 154(b) by 43 days.

(21) Appl. No.: 15/179,242

(22) Filed: Jun. 10, 2016

(65) Prior Publication Data

US 2017/0321374 A1    Nov. 9, 2017

(30) Foreign Application Priority Data

May 4, 2016 (KR) .......................... 10-2016-0055320

(51) Int. Cl.
D06N 3/14 (2006.01)
D06N 3/00 (2006.01)

(52) U.S. Cl.
CPC ............. D06N 3/14 (2013.01); D06N 3/0077 (2013.01)

(58) Field of Classification Search
CPC ............................... D06N 3/0077; D06N 3/14
USPC ............................... 428/96, 904; 156/60, 123
See application file for complete search history.

(56) References Cited

U.S. PATENT DOCUMENTS

| | | | |
|---|---|---|---|
| 3,549,475 A * | 12/1970 | Hefley | D04H 1/64 156/148 |
| 3,846,156 A * | 11/1974 | Seibert et al. | D06N 3/0052 427/354 |
| 6,228,480 B1 * | 5/2001 | Kimura | B01J 35/002 106/287.13 |
| 2004/0062913 A1 * | 4/2004 | Suto | B32B 27/12 428/141 |
| 2005/0222368 A1 * | 10/2005 | Reiners | C08G 18/0823 528/73 |
| 2006/0150863 A1 * | 7/2006 | Ueda | C09D 127/18 106/316 |
| 2008/0085416 A1 * | 4/2008 | Nagato | C09D 183/04 428/422 |

* cited by examiner

*Primary Examiner* — Thao T Tran
(74) *Attorney, Agent, or Firm* — Sughrue Mion, PLLC

(57) ABSTRACT

Provided a stain-resistant synthetic leather, including: (a) a polyurethane synthetic leather; (b) a silane-based coating layer formed on the polyurethane synthetic leather; and (c) a silicone coating layer formed on the silane-based coating layer, wherein the silane-based layer strengthens the binding between the polyurethane synthetic leather and the silicone coating layer, so that the stain-resistant synthetic leather can exhibit texture and flexibility of natural leather per se, and can exhibit excellent water resistance, stain resistance, weather resistance, and wear resistance through the silane-based coating layer and silicone coating layer formed on the polyurethane synthetic leather.

16 Claims, 7 Drawing Sheets
(5 of 7 Drawing Sheet(s) Filed in Color)

400

500

FIG. 9(a)
Fig. 9(b)
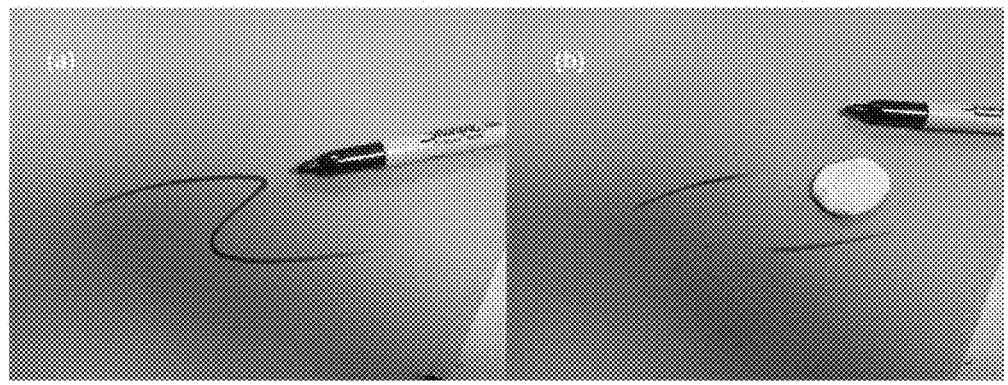
FIG. 10(a)
Fig. 10(b)
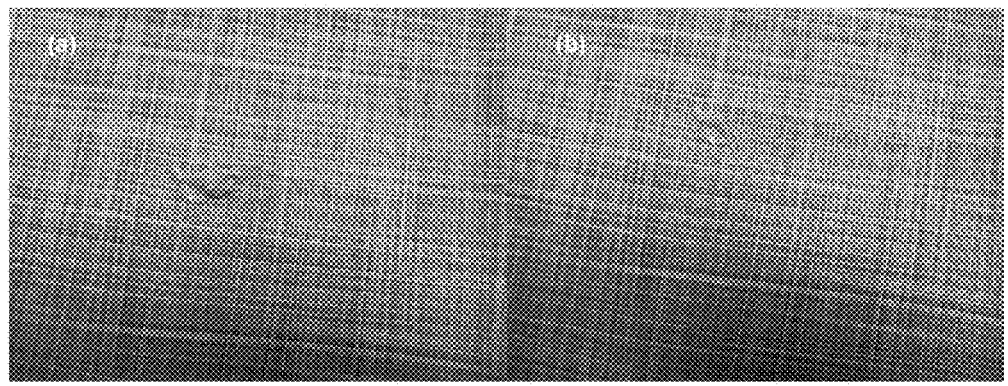

FIG. 11(a)    11(b)
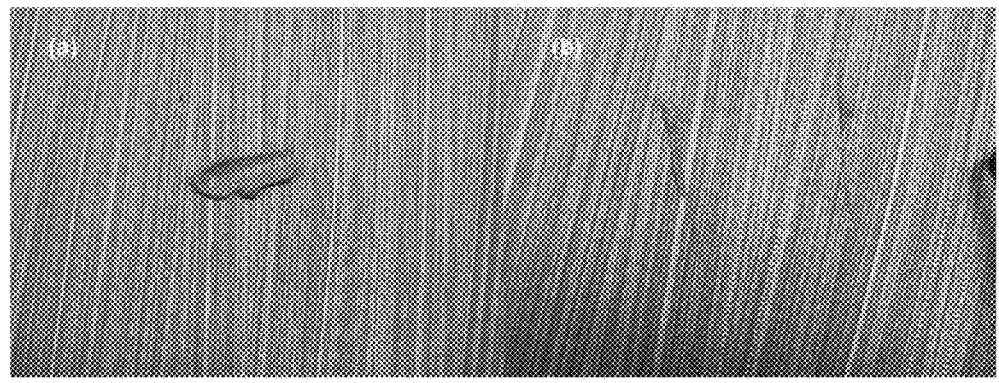
FIG. 12(a)    Fig. 12(b)
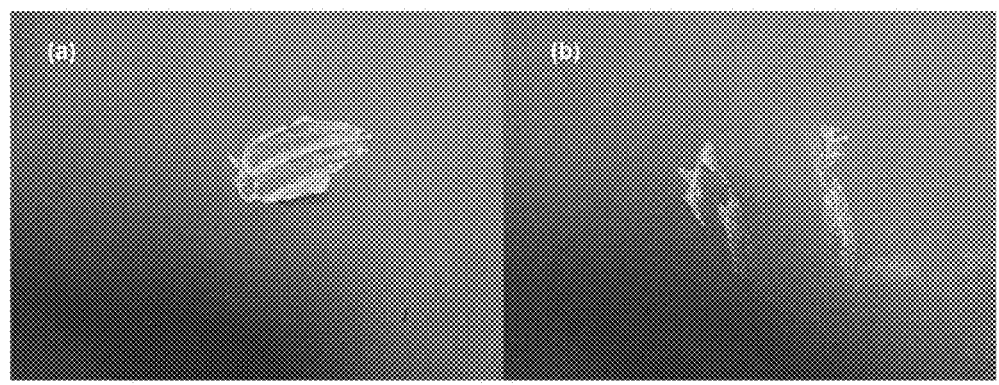

STAIN-RESISTANT SYNTHETIC LEATHER AND METHOD FOR MANUFACTURING SAME

CROSS-REFERENCE TO RELATED APPLICATIONS

This application claims benefit and priority to Korean Patent Application No. 10-2016-0055320, filed on May 4, 2016, with the Korean Intellectual Property Office, the disclosure of which is incorporated herein in its entirety by reference.

TECHNICAL FIELD

The present invention relates to a stain-resistant synthetic leather and a method for manufacturing the same and, more specifically, to a synthetic leather which exhibits not only smooth texture, flexibility, and superior surface effects of the natural leather but also excellent stain resistance, water resistance, and wear resistance, and to a method for manufacturing the same.

BACKGROUND

Generally, a textile fabric for interior application is being used for several years once installed. When they are contaminated by stains and spills, it is difficult to clean them every time, and these stains may leave bad marks on the surface, not good for aesthetics. Common stains include the ones caused by ball point pens, permanent marker, various liquids, solid or dust, impurities or other organic materials. Meanwhile, when a textile fabric is used in public places, such as hospitals, hotels, and restaurants, liquid stains or spills often seep through the open texture of the textile fabrics into the bottom cushion/foam underneath, and cause unsanitary environment in the public places.

Meanwhile, polyurethane-coated fabric substrates are frequently used as synthetic leathers. When these synthetic leathers are used for commercial furniture, it is very important that they have stain resistance to the contaminants and that they are easily cleanable. For the improvement of surface stain resistance of the synthetic leathers, a urethane or melamine-based anti-staining agent may be coated on a surface of the polyurethane coating layer. However, in this case, the surface shininess of the stain-resistant coating layer is increased, causing an artificial feeling of, for example, plastics, rather than the feel of leather. Moreover, in order to prevent an increase of shininess, a matting agent or the like may be added, but this causes a deterioration in the stain-resistant effect and rather causes a very rough feel of the surface, thereby degrading marketability.

In order to solve the above problems, a silicone synthetic leather product using silicone alone for a surface coating layer has been introduced on the market, but such a product is difficult to commercially use due to high price and the difficult processability of a silicone raw material.

SUMMARY

The present invention has been made to solve the above-mentioned problems occurring in the prior art, and an aspect of the present invention is to provide: a stain-resistant synthetic leather capable of exhibiting excellent stain resistance, water resistance, and wear resistance effects and superior surface texture and flexibility by sequentially forming a silane-based coating layer and a silicone coating layer on a polyurethane synthetic leather fabric; and a method for manufacturing the same.

In order to accomplish these objects, there is provided a stain-resistant synthetic leather, including: (a) a polyurethane synthetic leather; (b) a silane-based coating layer formed on the polyurethane synthetic leather; and (c) a silicone coating layer formed on the silane-based coating layer, wherein the silane-based layer strengthens the binding between the polyurethane synthetic leather and the silicone coating layer.

Here, (a) the polyurethane synthetic leather may include: (a-1) a fabric layer forming a leather substrate; and (a-2) a polyurethane coating layer formed on one surface or both surfaces of the fabric layer.

Here, the stain-resistant synthetic leather may further include: (d) a print layer formed between (a) the polyurethane synthetic leather and (b) the silane-based coating layer, the print layer having a predetermined color or pattern.

Here, the stain-resistant synthetic leather may further include: (e) a first adhesive layer for enhancing adhesive strength, formed between (a) the polyurethane synthetic leather and (d) the print layer.

Here, the stain-resistant synthetic leather may further include: between (a) the polyurethane synthetic leather and (b) the silane-based coating layer, (f) a second adhesive layer; and (g) a surface reinforcement layer for reinforcing mechanical strength of the synthetic leather, formed on the second adhesive layer.

Here, (b) the silane-based coating layer may be formed by cross-linkage of a $C_1$-$C_{10}$ modified alkylalkoxysilane. Here, the coating amount of (b) the silane-based coating layer may be in the range of 20-30 $g/m^2$.

Here, (c) the silicone coating layer may include: a linear siloxane; at least one cyclic siloxane; a siloxane-based copolymer; a silicone oil; and inorganic particles. Here, the coating amount of (c) the silicone coating layer is may be in the range of 20-50 $g/m^2$.

Here, an embossing pattern having a plurality of concave portions and convex portions may be formed on a surface of the stain-resistant synthetic leather.

In accordance with another aspect of the present invention, there is provided a method for manufacturing the stain-resistant synthetic leather, the method including: (i) preparing a polyurethane synthetic leather; (ii) forming a silane-based coating layer by coating a silane-based coating composition on one surface or both surfaces of the polyurethane synthetic leather, followed by drying; and (iii) forming a silicone coating layer by coating a silicone coating composition on the silane-based coating layer, followed by drying.

Here, the polyurethane synthetic leather in step (i) may be prepared by a step of forming a polyurethane coating layer on one surface or both surfaces of a fabric layer through a drying process or a wet/drying process.

Here, the silane-based coating composition in step (ii) may contains: on the basis of 100 parts by weight of the corresponding composition, 6-16 parts by weight of a $C_1$-$C_{10}$ modified alkylalkoxysilane; and the balance organic solvent to satisfy a total of 100 parts by weight of the composition.

Here, the silicone coating composition in step (iii) may be a two-component composition containing: a main agent obtained by blending a linear siloxane, at least one cyclic siloxane, a siloxane-based copolymer, a silicone oil, and inorganic particles, in an organic solvent; and a curing agent containing a metallic catalyst and an organic solvent.

Here, the drying in step (iii) may include: a first step of conducting drying at 60-75° C. for 1-10 min; and a second step of conducting aging at 70-90° C. for 24-30 hours.

Here, the method may further include: between steps (i) and (ii), (i-1) forming a print layer having a predetermined color or pattern on the polyurethane synthetic leather by coating and drying a composition for forming a print layer.

Here, the method may further include: between steps (i) and (ii), (i-2) forming a first adhesive layer on one surface of the polyurethane synthetic leather by coating and drying a first adhesive coating composition; and (i-3), while the first adhesive layer is semi-dried, arranging a print release paper having a transfer pattern on the semi-dried first adhesive layer, followed by compressing under a predetermined pressure and temperature, thereby transferring the print layer, and then removing the release paper.

Here, the method may further include: between steps (i) and (ii), (i-4) forming a second adhesive layer on one surface of the polyurethane synthetic leather by coating and drying a second adhesive coating composition; and (i-5) arranging a surface reinforcement film on the semi-dried second adhesive layer.

Also, the method may further include: after step (iii), (iv) emboss-processing a surface of the dried silicone coating layer.

The stain-resistant synthetic leather fabric of the present invention not only keep superior surface texture and flexibility intact, but can also exhibit excellent stain resistance, water resistance, and wear resistance through a polyurethane synthetic leather, a silane-based coating layer, and a silicone coating layer that are sequentially formed.

Furthermore, the stain-resistant synthetic leather of the present invention is useful since it causes fewer defects due to excellent surface hardness thereof when used as a surface finishing material for furniture or interior products; it is hardly stained with contaminants of daily life; and even if stained, the contaminants can be easily removed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features, and advantages of the present invention will be more apparent from the following detailed description taken in conjunction with the accompanying drawings, in which:

FIGS. 6(a), 6(b), 7(a), 7(b), 8(a), 8(b), 9(a), and 9(b) are images illustrating evaluation results of stain resistance to a contaminant (oil-based ballpoint pen) of the stain-resistant synthetic leathers of the present invention;

FIGS. 10(a), 10(b), 11(a), 11(b), 12(a) and 12(b) are images illustrating evaluation results of stain resistance to a contaminant (mustard) of the stain-resistant synthetic leathers of the present invention;

BRIEF DESCRIPTION OF THE INDICATIONS IN THE DRAWINGS

Figure 1:
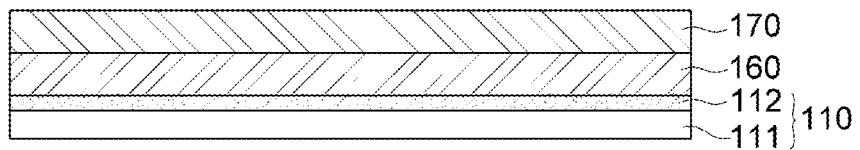
FIG. 1 is a cross-sectional view showing a structure of a stain-resistant synthetic leather according to an embodiment of the present invention.

100, 200, 300, 400, 500: stain-resistant synthetic leather
110: a polyurethane synthetic leather
111: a fabric layer
112: a polyurethane coating layer
120: a first adhesive layer
130: a print layer
140: a second adhesive layer
150: a surface reinforcement layer
160: a silane-based coating layer
170: a silicone coating layer

DETAILED DESCRIPTION OF THE PREFERRED EMBODIMENTS

The features of the present invention will be described in detail with reference to accompanying drawings.

Hereinafter, the expression "B formed above (or below) A" or "B formed on A" used herein includes all of cases when B is directly attached to an upper or lower surface of A, when B is attached to an upper or lower surface of A by means of an adhesive layer or a glue layer, and when at least one separate layer is formed on an upper or lower surface of A and B is attached to the separate layer directly or by means of a glue, an adhesive, etc.

In order to improve stain resistance of a polyurethane synthetic leather (that is, a polyurethane-coated fabric substrate), an anti-staining agent may be used. This case somewhat increases the stain resistant effect, but causes a deterioration in the feel of the surface and an increase in the surface glossiness, and thus the product quality is degraded.

Meanwhile, silicone retains excellent stain resistance, but silicone is hardly usable in a mixture with other surface coating agents due to low compatibility with other materials, and thus silicone is used alone. However, the application of the 100% silicone coating material causes a deterioration in economical feasibility due to high-priced silicone. Moreover, due to low chemical compatibility of silicone with other materials, silicone cannot exhibit effects of textile and natural leather through various types of printing, and thus various surface effects cannot be produced.

Therefore, the present invention is to solve the problems of the polyurethane-coated fabric substrate (e.g., polyurethane synthetic leather) and the silicone-coated fabric substrate (e.g., silicone synthetic leather), and to secure advantages of the polyurethane coating layer and the silicone coating layer, respectively.

More specifically, while the polyurethane resin has polarity, the silicone resin has non-polarity, and thus there is no chemical compatibility therebetween. Due to this, the use of the polyurethane resin together with the silicone resin as ingredients of coating layers constituting a synthetic leather causes significant deteriorations in basic physical properties, including adhesive strength between the respective coating layers.

The present invention is characterized in that a silicone coating layer is introduced into the uppermost portion of the polyurethane synthetic leather, and a silane-based coating layer capable of strongly binding the polyurethane synthetic leather and the silicone coating layer in physical and chemical manners is introduced as a middle layer between the polyurethane synthetic leather and the silicone coating layer.

The silane-based coating layer has a siloxane bond (—Si—O—), and thus can significantly increase the adhesive strength due to its high compatibility and affinity with the silicone coating layer in contact therewith. In addition, due to a polar moiety, e.g., a (meth)acryloyloxy group, contained in the silane-based coating layer, the silane-based coating layer enhances the binding strength with the polyurethane coating layer exhibiting surface polarity. Accordingly, the present invention can maximize respective advantages of polyurethane and silicones and improve economical efficiency by applying, while using the polyurethane coating layer together with the silicone coating layer as the main layers constituting the stain-resistant synthetic leather, eco-friendly and cheap polyurethane as a base of the stain-resistant synthetic leather and applying expensive silicone to only a surface layer thereof.

That is, due to the polyurethane coating layer, improved wear resistance, weather resistance, heat resistance, and cold resistance can be exhibited; and excellent water resistance can be exhibited since a liquid cannot get in the polyurethane coating layer. In addition, various surface effects can be created through various types of printing performed on the polyurethane coating layer.

In addition, the uppermost coating layer of the stain-resistant synthetic leather is silicone-based, and thus can exhibit an excellent stain-resistant effect due to eco-friendly features and low surface tension of silicone and can continuously maintain superior smooth surface texture and flexibility and a matte and waxy surface, thereby reproducing the feel of high-grade natural leather.

<Stain-Resistant Synthetic Leather>

Hereinafter, respective coating layers constituting the stain-resistant synthetic leather according to the present invention and compositions thereof will be described. Here, the coating amounts of respective coating layers constituting the stain-resistant synthetic leather of the present invention are based on the amounts of the coating layers that are applied to a 1 m² fabric, and the coating amounts of respective coating layers may be appropriately changed depending on the weight of a fabric to be used.

FIGS. 1 to 5 are schematic views illustrating cross-sectional structures of stain-resistant synthetic leathers according to embodiments of the present invention, respectively.

Referring to FIG. 1, the stain-resistant synthetic leather 100 shows a structure in which a silane-based coating layer 160 and a silicone coating layer 170 are sequentially formed on one surface or both surfaces of a polyurethane synthetic leather 110.

Herein, as the polyurethane synthetic leather 110, conventional polyurethane-based synthetic leather that is known in the art may be used, but is not particularly limited thereto.

Specifically, the polyurethane synthetic leather 110 includes: a fabric layer 111 that forms a leather substrate; and a polyurethane coating layer 112 formed on one surface or both surfaces of the fabric layer.

The fabric layer 111 is used as a coating substrate for the polyurethane coating layer, and serves as a backing for supporting the stain-resistant synthetic leather. A woven or non-woven fabric that is known in the art may be used as the fabric layer 111, but is not particularly limited thereto.

For examples, the woven or non-woven fabric may be: a woven or non-woven fabric prepared by using alone or two or more of synthetic resin fibers, such as a polyester fiber, a viscose rayon fiber, a polyamide fiber, a polyurethane fiber, an acrylic fiber, a polyolefin fiber, and a cellulose fiber; a woven or non-woven fabric prepared by using cotton (e.g., thread made of cotton); or a woven or non-woven prepared by mixing the synthetic resin fiber and cotton. Of these, it is preferable to use a woven fabric prepared by using a mixture of the polyester fiber, viscose rayon fiber, polyamide fiber, or polyester fiber and the cotton, or the polyester fiber and the viscose rayon fiber, but the present invention is not limited thereto. A polyester textile fabric is woven using a polyester fiber that is stretched to have a very little or reduced elongation rate, and this polyester textile fabric has high tension, low hygroscopicity, and excellent chemical resistance. In addition, an elastic fabric material, such as spandex, may be used.

A method of preparing a woven or non-woven fabric using the above-mentioned material may be, but is not particularly limited to, a general paper-manufacturing or weaving process. The thickness of the fabric layer 111 is not particularly limited, and thus may be in the range of, for example, 0.3-2 mm.

The polyurethane coating layer 112 formed on the fabric layer 111 is a layer that makes a base of the stain-resistant synthetic leather, and can exhibit an intrinsic texture that is indigenous to leather, prevent the damage to the fabric layer 111 as a substrate therefor, and show improved wear resistance. In addition, the polyurethane coating layer 112 can exhibit excellent water resistance since a liquid cannot get in.

The polyurethane coating layer 112 may be formed of a conventional polyurethane resin that is known in the art. For example, polyether polyurethane, polyester polyurethane, polycarbonate polyurethane, polyetherester polyurethane, polyethercarbonate polyurethane, polycaprolactone polyurethane, hydrocarbon polyurethane, cycloaliphatic polyurethane, aromatic polyurethane, or a combination of one or more thereof may be used. In addition, the molecular weight of the polyurethane resin is not particularly limited.

The polyurethane coating layer 112 may be formed by a conventional method that is known in the art, such as a dry process or a wet/dry process.

For example, the dry process may be conducted by transfer-coating and bonding a polyurethane resin onto the fabric layer using a release paper. The thickness of the polyurethane coating layer formed through the dry process may be in the range of 0.1-0.3 mm, and the coating amount of the polyurethane resin may be in the range of 50-200 g/m² in terms of the solid content.

In addition, as for the wet/dry process, the polyurethane synthetic leather may be manufactured by coating a polyurethane coating composition on one surface or both surfaces of the fabric substrate (fabric layer) through a wet process, followed by drying, and then forming a surface coating layer (skin layer) through the above-described dry process. In the polyurethane coating layer formed by the wet/dry process, the coating amount of the polyurethane resin in the polyurethane coating layer may be in the range of 150-500 g/m², and preferably 200-300 g/m², in terms of the solid content.

In cases where the coating amount for the polyurethane coating layer through the dry or wet/dry process is within the foregoing range, an excellent coating effect, a fast drying rate, and favorable workability can be attained.

The polyurethane coating layer 112 may be transparent or may have a colored form through the addition of pigments. Here, as the pigments, conventional organic and/or inorganic pigments that are known in the art may be used without limitation.

The present invention includes a silane-based coating layer 160 between the polyurethane synthetic leather 110 and the silicone coating layer 170.

The silane-based coating layer 160 is disposed between the polyurethane synthetic leather 110 and the silicone layer 170, and serves as a cross-linking agent for significantly increasing the adhesive strength to facilitate the binding between the polyurethane synthetic leather 110 and the silicone layer 170. The silane-based coating layer 160 enables the polyurethane layer, which is a base layer of the stain-resistant synthetic leather, to be used together with the silicone layer, which is a surface layer, thereby producing various surface effects through the use of polyurethane, and exhibiting excellent stain resistance, superior smooth surface texture, matte surface characteristics, and water resistance, through the use of silicone.

The silane-based layer 160 may be formed using a conventional $C_1$-$C_{10}$ modified alkylalkoxysilane that is known in the art without limitation. For example, a modified alkylalkoxysilane, which has a $C_1$-$C_{10}$ alkyl and/or alkoxy group and an acryloyloxy or methacryloyloxy group in the terminal thereof, may be used without limitation.

Non-limited examples of the usable modified alkylalkoxysilanes may include acryloyloxypropyl trimethoxysilane, methacryloxypropyl trimethoxysilane, acryloyloxypropyl triethoxysilane, methacryloxypropyl triethoxysilane, and the like. These may be used alone or in a mixture of two or more thereof. Especially, 3-(acryloyloxy)propyl trimethoxysilane and/or 3-(methacryloxy)trimethoxysilane may be preferably used.

In addition to the above-described modified alkylalkoxysilanes, conventional alkylalkoxysilanes that are known in the art may be further used. For example, the conventional alkylalkoxysilanes may be compounds in which at least one $C_1$-$C_{10}$ alkyl group and one or more alkoxy groups selected from methoxy, ethoxy, and protoxy are directly bound to a silicon atom, and may be, preferably, monoalkyltrialkoxysilanes.

Non-limited examples of the usable alkylalkoxysilanes may include methyltrimethoxysilane, ethyltrimethoxysilane, propyltrimethoxysilane, butyltrimethoxysilane, pentyltrimethoxysilane, hexyltrimethoxysilane, hexyltriethoxysilane, heptyltrimethoxysilane, heptyltriethoxysilane, octyltrimethoxysilane, octyltriethoxysilane, nonyltrimethoxysilane, nonyltriethoxysilane, decyltrimethoxysilane, decyltriethoxysilane, undecyltrimethoxysilane, undecyltriethoxysilane, dodecyltrimethoxysilane, dodecyltriethoxysilane, and the like. These may be used alone or in a mixture of two or more thereof.

The silane-based coating layer 160 may be formed by cross-linkage using a modified alkylalkoxysilane, as a basic resin, alone or further using conventional additives that are known in the art. For example, the modified alkylalkoxysilanes may preferably contain a conventional cross-linking agent that is known in the art.

Herein, the coating amount of the silane-based material in the silane-based coating layer 160 may be in the range of 20-30 $g/m^2$, and preferably 25-30 $g/m^2$. In cases where the coating amount of the silane-based coating layer is within the foregoing range, an excellent adhesive effect between the polyurethane synthetic leather 110 and the silicone coating layer 170, superior coatability, and favorable workability can be attained.

The silane-based coating layer 160 may be transparent or may have a colored form through the addition of pigments. Preferably, the silane-based coating layer 160 may be a transparent coating layer, which can exhibit various colors or patterns intact of a print layer 140.

The silicone coating layer 170 of the present invention is formed on the silane-based coating layer 160 to serve to exhibit excellent stain resistance and wear resistance.

The silicone coating layer 170 may be formed using a conventional silicone resin that is known in the art alone or using the silicone resin together with other ingredients.

According to a preferable embodiment of the present invention, the silicone coating layer 170 may include: (i) a linear siloxane; (ii) at least one cyclic siloxane; (iii) a siloxane-based copolymer; (iv) a silicone oil; and (v) inorganic particles.

As the linear siloxane, a conventional linear-structured siloxane that is known in the art may be used. For example, linear polydimethylsiloxane may be used, and preferably, dimethyl polysiloxane may be used.

In addition, siloxanes having a ring in the molecule thereof may be used as the cyclic siloxane, and for example, octamethylcyclotetrasiloxane, decamethylcyclopentasiloxane, or both thereof may be used. Here, the ratio of linear siloxane to cyclic siloxane used may be in a weight ratio range of 20-40:80-60.

Examples of the siloxane-based copolymer are not particularly limited so long as one or more siloxane-based monomers are copolymerized, and for example, methylhydrosiloxane-dimethylsiloxane copolymer may be preferable.

In addition, as the silicone oil, conventional silicone oil that is known in the art may be used, and for example, the conventional silicone oil may have an emulsion form in which dimethylpolysiloxane and water are mixed.

In addition, examples of the inorganic particles may include conventional inorganic particles that are known in the art. Non-limited examples of the usable inorganic particles may include particles of silica ($SiO_2$), alumina ($Al_2O_3$), $SnO_2$, MgO, CaO, titanium dioxide, or a mixture thereof.

Herein, the coating amount for the silicone coating layer 170 may be in the range of 20-50 $g/m^2$, and preferably 30-50 $g/m^2$. In cases where the coating amount for the silicone coating layer is within the foregoing range, not only excellent stain resistance and wear resistance but also matte and waxy effects can be attained.

The stain-resistant synthetic leather according to the present invention may further include a print layer having predetermined colors and/or patterns.

Figure 2:
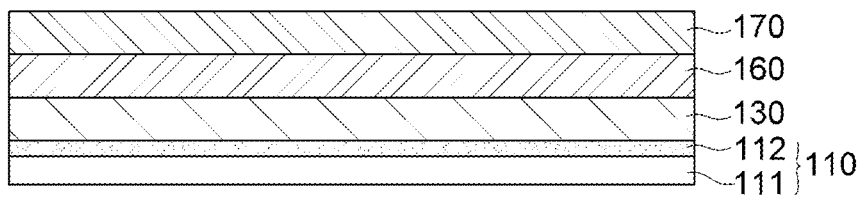
FIG. 2 is a cross-sectional view showing a structure of a stain-resistant synthetic leather according to another embodiment of the present invention.

FIG. 2 is a schematic view illustrating a cross-sectional structure of the stain-resistant synthetic leather 200 according to another embodiment of the present invention. The stain-resistant synthetic leather 200 includes: a polyurethane synthetic leather 110; and a print layer 130, a silane-based coating layer 160, and a silicone coating layer 170 formed on the polyurethane synthetic leather 110.

Here, the position to which the print layer 130 is introduced is not particularly limited, and preferably, the print layer 130 is disposed between the above-described polyurethane synthetic leather 110 and silane-based coating layer 160.

Here, the print layer 130 variously realizes intrinsic colors and/or patterns of the stain-resistant synthetic leather per se.

The colors and/or patterns of the print layer 130 are not particularly limited, and may be properly adopted according to usage or a user's need. For example, the print layer may have a colored form containing conventional pigments that are known in the art, or may have a form of including both predetermined patterns and colors.

The print layer 130 may be formed by using a conventional printing method that is known in the art, but is not limited thereto.

Non-limited examples of the usable printing methods may include screen printing, gravure printing, rotogravure printing, flexographic printing, offset printing, digital printing, transfer printing, rotary screen printing, and the like. For example, the print layer 130 may be directly printed on the polyurethane synthetic leather using to the foregoing printing methods to display colors or may form predetermined print patterns.

Meanwhile, a print layer with predetermined patterns may be formed by using a print release paper with a transfer pattern.

In cases where the print layer is formed on the polyurethane synthetic leather through transfer printing as described above, the adhesive strength between the polyurethane synthetic leather and the print layer with transfer patterns may deteriorate, and thus, it is preferable to further include a first adhesive layer for enhancing the adhesive strength therebetween.

Figure 3:
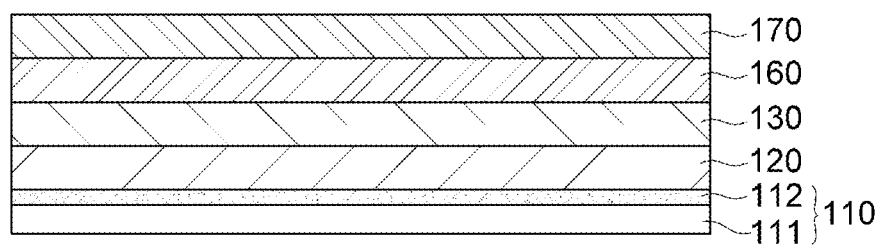
FIG. 3 is a cross-sectional view showing a structure of a stain-resistant synthetic leather according to another embodiment of the present invention.

FIG. 3 is a schematic view illustrating a cross-sectional structure of the stain-resistant synthetic leather 300 according to another embodiment of the present invention. The stain-resistant synthetic leather 300 includes: a polyurethane synthetic leather 110; and on the polyurethane synthetic leather 110, a first adhesive layer 120, a print layer 130, a silane-based coating layer 160, and a silicone coating layer 170.

The first adhesive layer 120 is formed on the polyurethane synthetic leather 110 to serve to firmly glue between the polyurethane synthetic leather 110 and the print layer 130. The first adhesive layer 120 is not particularly limited in view of ingredients, thickness, and coating amount thereof, so long as the adhesion between the polyurethane synthetic leather 110 and the print layer 130 can be continuously maintained.

Here, for the first adhesive layer 120, conventional adhesives that are known in the art may be used without limitation, and preferably, the conventional adhesives are urethane-based adhesives that have an excellent miscibility with the polyurethane coating layer, which is a main component of the polyurethane synthetic leather. As the urethane-based adhesives, conventional two-component polyurethane adhesives that are known in the art may be used, and these two-component adhesives may contain a urethane-based main agent and a curing agent.

In addition, the coating amount for the first adhesive layer 120 may be in the range of 20-40 $g/m^2$, and preferably 30-40 $g/m^2$. In cases where the coating amount for the first adhesive layer is within the foregoing range, excellent adhesion and coatability, a fast drying rate, and favorable workability can be attained. Here, the first adhesive layer 120 may be transparent or may have a colored form through the addition of pigments.

As for an example of the print layer 130 formed through transfer printing, a first surface of a print release paper, which has transfer patterns and colors, is disposed to be in contact with the first adhesive layer 120, followed by compression through pressing under predetermined temperature and pressure conditions, and then, the print release paper is removed, so that the patterns and colors of the print release paper can be transferred to the polyurethane synthetic leather.

The stain-resistant synthetic leather according to the present invention may further include a second adhesive layer and a surface reinforcement layer as needed.

Figure 4:
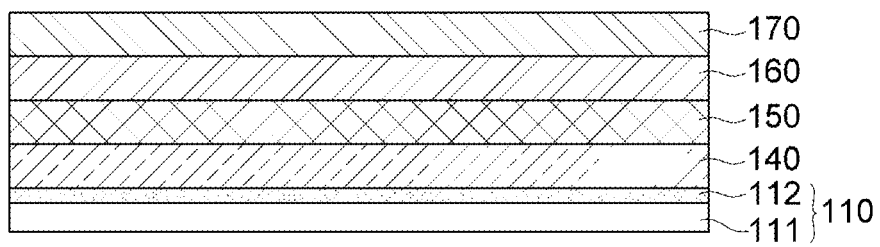
FIG. 4 is a cross-sectional view showing a structure of a stain-resistant synthetic leather according to another embodiment of the present invention.

FIG. 4 is a schematic view illustrating a cross-sectional structure of the stain-resistant synthetic leather 400 according to another embodiment of the present invention. The stain-resistant synthetic leather 400 includes: a polyurethane synthetic leather 110; and a second adhesive layer 140, a surface reinforcement layer 150, a silane-based coating layer 160, and a silicone coating layer 170 formed on the polyurethane synthetic leather 110.

Here, the positions to which the second adhesive layer 140 and the surface reinforcement layer 150 are introduced are not particularly limited, and the second adhesive layer 140 and the surface reinforcement layer 150 are disposed, preferably, between the polyurethane synthetic leather 110 and the silane-based coating layer 160, and more preferably between the print layer 130 and the silane-based coating layer 160.

Here, in cases where the second adhesive layer 140 and the surface reinforcement layer 150 are disposed between the polyurethane synthetic leather 110 and the silane-based coating layer 160, the second adhesive layer 140 is formed on the polyurethane synthetic leather 110 to serve as a glue between the polyurethane synthetic leather 110 and the surface reinforcement layer 150. Here, in cases where the second adhesive layer 140 and the surface reinforcement layer 150 are disposed between the print layer 130 and the silane-based coating layer 160, the second adhesive layer 140 is formed on the print layer 130 to serve to firmly glue the polyurethane synthetic leather 110, the print layer 130, and the surface reinforcement layer 150.

Here, the second adhesive layer 140 is not particularly limited in view of ingredients, thickness, and coating amount thereof, so long as the adhesion between the respective coating layers in contact with each other can be continuously maintained For example, the second adhesive layer 140 may be formed of an adhesive ingredient, which is the same as, or different from, that of the above-described first adhesive layer 120, and preferably, a urethane-based adhesive, which is the same ingredient as in the first adhesive layer 120, may be used.

The coating amount of the second adhesive layer 140 is not particularly limited, and thus may be in the range of, for example, 20-40 $g/m^2$, and preferably 30-40 $g/m^2$. In cases where the coating amount of the second adhesive layer is within the foregoing range, excellent adhesion and coatability, a fast drying rate, and favorable workability can be attained. Here, the second adhesive layer 140 may be transparent or may have a colored form through the addition of pigments.

Herein, the surface reinforcement layer 150 disposed on the second adhesive layer 140 serves to enhance mechanical strength, surface strength, and hardness of the stain-resistant synthetic leather of the present invention.

As the surface reinforcement layer 150, a conventional plastic film that is known in the art may be used without limitation. For example, films formed of polyethylene terephthalate (PET) or PVC plastic materials, and preferably a PET film may be used. In addition, the thickness of the surface reinforcement layer 150 is not particularly limited, and for example, the thickness thereof is in the range of, for example, 5-15 µm, and preferably 10-12 µm.

The present invention may further include a conventional water-proof layer or a protective layer that is known in the art, in addition to the above-described ingredients.

The stain-resistant synthetic leather having the above-described structure may have five embodiments as shown below. However, the present invention is not limited by the exemplified embodiments, and a lot of modifications and applications are possible as needed.

FIG. 1 is a cross-sectional view illustrating a stain-resistant synthetic leather 100 according to a first embodiment of the present invention.

Specifically, the stain-resistant synthetic leather 100 has a structure in which, on a first surface of a polyurethane synthetic leather 110, a silane-based coating layer 160 and a silicone coating layer 170 are, respectively and sequentially formed. Here, the polyurethane synthetic leather 110 includes a fabric layer 111, which is a leather substrate, and a polyurethane layer 112.

FIG. 2 is a cross-sectional view illustrating a stain-resistant synthetic leather 200 according to a second embodiment of the present invention.

Specifically, the stain-resistant synthetic leather 200 has a structure in which, on a first surface of a polyurethane synthetic leather 110, a print layer 130, a silane-based coating layer 160, and a silicone coating layer 170 are, respectively and sequentially formed.

FIG. 3 is a cross-sectional view illustrating a stain-resistant synthetic leather 300 according to a third embodiment of the present invention.

Specifically, the stain-resistant synthetic leather 300 has a structure in which, on a first surface of a polyurethane synthetic leather 110, a first adhesive layer 120, a print layer 130, a silane-based coating layer 160, and a silicone coating layer 170 are respectively and sequentially formed.

FIG. 4 is a cross-sectional view illustrating a stain-resistant synthetic leather 400 according to a fourth embodiment of the present invention.

Specifically, the stain-resistant synthetic leather 400 has a structure in which, on a first surface of a polyurethane synthetic leather 110, a second adhesive layer 140, a surface reinforcement layer 150, a silane-based coating layer 160, and a silicone coating layer 170 are respectively and sequentially formed.

Figure 5:
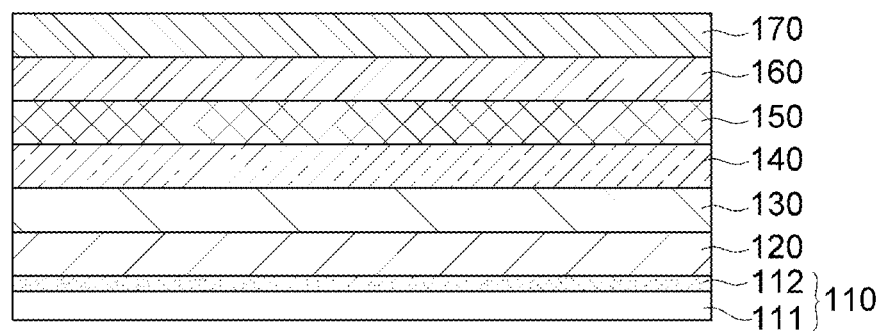
FIG. 5 is a cross-sectional view showing a structure of a stain-resistant synthetic leather according to another embodiment of the present invention.
Figures 6A, 6B:
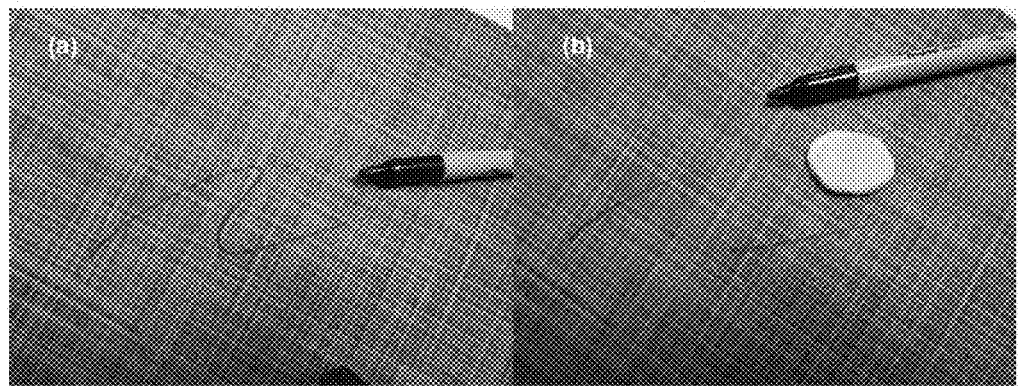
Figures 7A, 7B:
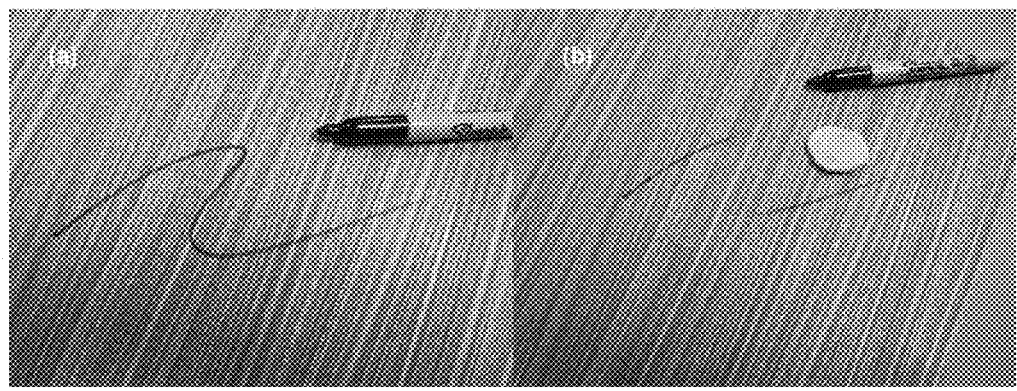
Figures 8A, 8B:
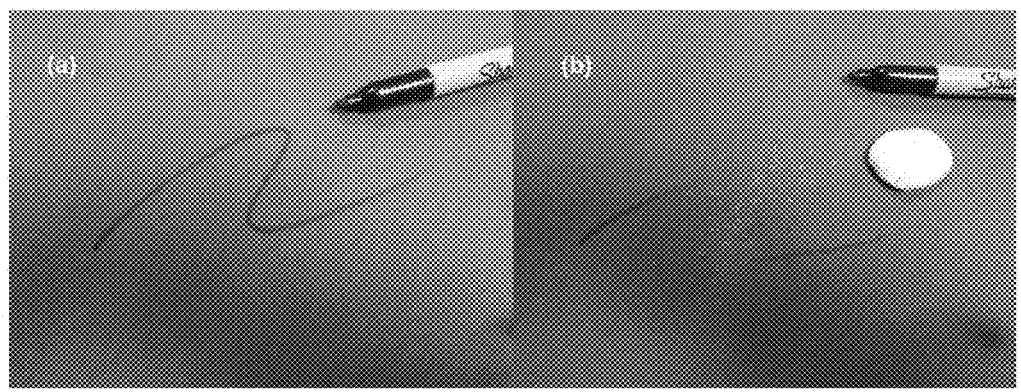
Figures 13A, 13B:
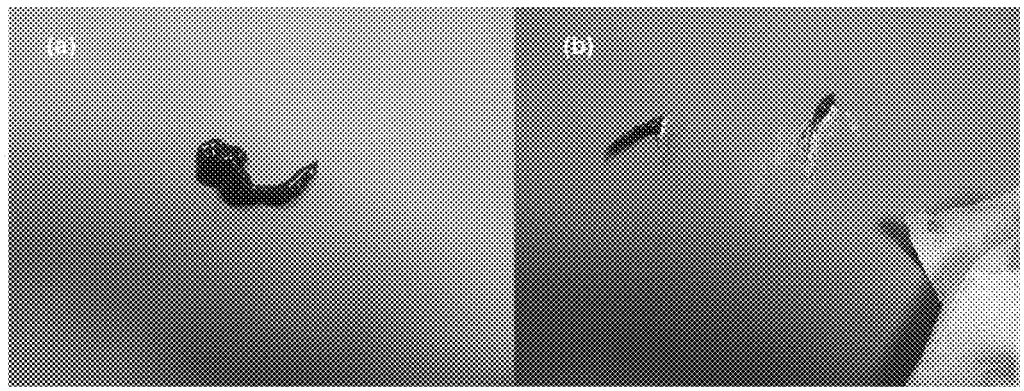
FIGS. 13(a), 13(b), and 14 are images illustrating evaluation results of stain resistance to a contaminant (ketchup) of the stain-resistant synthetic leathers of the present invention.
Figure 14:

FIG. 5 is a cross-sectional view illustrating a stain-resistant synthetic leather 500 according to a fifth embodiment of the present invention.

Specifically, the stain-resistant synthetic leather 500 has a structure in which, on a first surface of a polyurethane synthetic leather 110, a first adhesive layer 120, a print layer 130, a second adhesive layer 140, a surface reinforcement layer 150, a silane-based coating layer 160, and a silicone coating layer 170 are respectively and sequentially formed.

Meanwhile, exemplified herein is a structure of including the silane-based coating layer 160 and the silicone coating layer 170 sequentially formed on the polyurethane synthetic leather 110, or further including the first adhesive layer 120, the print layer 130, the second adhesive layer 140, and the surface reinforcement layer 150. However, the present invention is not particularly limited thereto, and thus the features of freely selecting the number of coating layers constituting the stain-resistant synthetic leather and the stacking order of the coating layers depending on the use of the stain-resistant synthetic leather are also included in the scope of the present invention. For example, the order of the foregoing coating layers may be changed, or a multi-layer structure may be obtained by introducing other surface layers.

The stain-resistant synthetic leather 100 may have an embossing pattern with a plurality of concave portions and convex portions, the embossing pattern being formed on a surface of the stain-resistant synthetic leather through embossing processing as needed.

<Manufacturing Method of Stain-Resistant Synthetic Leather>

Hereinafter, a method for manufacturing a stain-resistant synthetic leather according to an embodiment of the present invention will be described. However, the method of the present invention is not limited to only the following manufacturing method, and respective process steps may be modified or selectively mixed as needed.

According to a preferable embodiment of the present invention, the method for manufacturing the stain-resistant synthetic leather, including: (i) preparing a polyurethane synthetic leather ("step S10"); (ii) forming a silane-based coating layer by coating a silane-based coating composition on one surface or both surfaces of the polyurethane synthetic leather, followed by drying ("step S20"); and (iii) forming a silicone coating layer by coating a silicone coating composition above the silane-based coating layer, followed by drying ("step S30").

As needed, the method may further include: between steps (i) and (ii), (i-1) forming a print layer having a predetermined color or pattern on the polyurethane synthetic leather by coating and drying a composition for forming a print layer ("step S11").

Also, the method may further include: between steps (i) and (ii), (i-2) forming a first adhesive layer on one surface of the polyurethane synthetic leather by coating and drying a first adhesive coating composition ("step S12-a"); and (i-3), while the first adhesive layer is semi-dried, arranging a print release paper having a transfer pattern on the semi-dried first adhesive layer, followed by compressing under a predetermined pressure and temperature, thereby transferring the print layer, and then removing the release paper ("step S12-b").

Also, the method may further include: between steps (i) and (ii), (i-4) forming a second adhesive layer on one surface of the polyurethane synthetic leather by coating and drying a second adhesive coating composition ("step S13"); and (i-5) arranging a surface reinforcement film on the semi-dried second adhesive layer ("step S14").

Also, the method may further include: after step (iii), (iv) emboss-processing a surface of the dried silicone coating layer ("step S40").

Hereinafter, the manufacturing method will be described by steps.

(1) Step of Preparing Polyurethane Synthetic Leather (Hereinafter, "Step S10").

In step S10, a polyurethane synthetic leather used as a coating base of a stain-resistant synthetic leather is prepared.

Herein, for the polyurethane synthetic leather, general polyurethane synthetic leathers that are conventionally used in the art may be used intact, or polyurethane synthetic leathers, in which a polyurethane coating layer is formed on a fabric substrate (fabric layer) through a conventional dry process or wet/dry process, may be used.

In cases where the dry process is employed in step S10, the polyurethane synthetic leather may be prepared by transfer-coating and bonding a polyurethane resin onto a fabric layer using a release paper. The thickness of the polyurethane coating layer formed through the dry process may be in the range of 0.1-0.3 mm, and the coating amount of the polyurethane resin in the polyurethane coating layer may be in the range of 50-200 $g/m^2$ in terms of the solid content.

In addition, as for the wet/dry process, the polyurethane synthetic leather may be prepared by coating a polyurethane coating composition on one surface or both surfaces of the fabric substrate (fabric layer) through a wet process, followed by drying, and then forming a surface coating layer through the above-described dry process. In the wet/dry process, the polyurethane coating composition contains a polyurethane resin in the range of 150-500 $g/m^2$ in terms of the solid content.

Here, the polyurethane coating composition is a liquid resin composition containing a polyurethane resin, which is selected depending on the substrate material, and an organic solvent, and may contain a conventional curing agent that is generally used in the art as needed. For example, the coating composition is prepared by dispersing a polyurethane resin in an organic solvent and diluting the dispersion to a proper concentration. The polyurethane coating composition contains, on the basis of 100 parts by weight of the composition, for example, 30-60 parts by weight of a polyurethane resin, and the balance organic solvent to satisfy a total of 100 parts by weight of the composition, and preferably the content of the polyurethane resin may be 35-45 parts by weight. Here, the polyurethane coating composition may further contain 5-15 parts by weight of a pigment or other conventional additives.

As the curing agent and the organic solvent, a conventional curing agent and organic solvent that are known in the art may be used without limitation. Non-limited examples of the usable solvent may include: ketone-based solvents such as methylethylketone (MEK), methylisobutylketone (MIBK), and acetone; alcohol-based solvents such as isopropyl alcohol (IPA) and n-hexanol; 1,2-dichlorobenzene N-methylpyrrolidone (NMP), N,N-dimethyl form amide (DMF), and the like. If necessary, the coating composition may further contain: a filler for reinforcement or a filler for a weight, such as colloidal silica or fumed silica; a colorant and a pigment; a heat stabilizer, a UV stabilizer, and a weather-resistant stabilizer; a flame-retardant, a thickening agent, a herbicide, a preservative, and the like.

In step S10, the method of coating the polyurethane coating composition through a wet process is not particularly limited, and a conventional coating method that is known in the art may be employed. For example, bar coating may be employed. Here, the viscosity of the polyurethane coating composition may be in the range of 1,000-20,000 cps, but is not particularly limited thereto.

After the polyurethane coating layer is formed on the fabric layer through a dry process or a wet/dry process as described above, the formed polyurethane coating layer is exposed to air for a sufficient time, thereby forming a cured film. Here, the drying time and the drying conditions may be controlled within conventional ranges, and for example, the drying may be conducted at room temperature or at about 120-200° C. for 1 min to 24 hours.

(2) Step of Forming Print Layer

In the present invention, if necessary, a print layer having predetermined colors or patterns may be formed on the polyurethane synthetic leather or the first adhesive layer.

The print layer formed in step (2) may be in a solid form containing pigments, or a form including both predetermined patterns and colors. This print layer may be prepared by a conventional method that is known in the art, and for example, the print layer may be formed by two methods below.

With respect to a first embodiment of step (2), the predetermined colors or patterns are formed by performing direct printing on the polyurethane synthetic leather using a conventional colorant composition (composition for forming a print layer) and a conventional printing method (hereinafter, "step S11").

The colorant composition may basically contain pigments and additives, and may further a binder as needed. Here, for the pigments, additives, and binder, conventional ingredients that are known in the art may be used without limitation, and the compositions thereof may also be properly adjusted within the ranges that are known in the art.

In addition, for the printing method in step S11, a conventional printing method that is known in the art may be employed without limitation. Non-limited examples of the usable printing method include screen printing, gravure printing, rotogravure printing, flexographic printing, offset printing, digital printing, transfer printing, rotary screen printing, and the like.

With respect to a second embodiment of step (2), the predetermined patterns are formed by transferring a print release paper with transfer patterns onto the first adhesive layer (hereinafter, "step S12").

Here, the completely dried first adhesive layer may cause a deterioration in the adhesion with the print release paper to be transferred, and thus, preferably, the first adhesive layer is semi-dried and has a partially wet surface.

With respect to a second embodiment of step S12, a first adhesive layer is formed on one surface of the polyurethane synthetic leather by coating and drying a first adhesive coating composition ("step S12-a"); and while the first adhesive layer is semi-dried, a print release paper having a transfer pattern is arranged on the semi-dried first adhesive layer, followed by compressing under a predetermined pressure and temperature, thereby transferring the print layer, and then the release paper is removed ("step S12-b").

For the first adhesive layer in step S12-a, an adhesive ingredient that is known in the art may be used without limitation, and preferably a two-component urethane adhesive may be used.

The two-component urethane adhesive may contain a polyurethane resin, a curing agent, and an organic solvent. Here, the content of the curing agent may be 15-25 parts by weight on the basis of 100 parts by weight of the polyurethane resin, and the content of the organic solvent may be 65-80 parts by weight on the basis of 100 parts by weight of the polyurethane resin. For example, the two-component urethane adhesive may, preferably, contain a polyurethane resin; and on the basis of 100 parts by weight of the polyurethane resin, 20 parts by weight of a curing agent and 70 part by weight of an organic solvent (MEK). Here, the coating amount for the first adhesive may be in the range of 20-40 $g/m^2$, and preferably 30-40 $g/m^2$.

In step S12-a, the coating of the first adhesive may be conducted by using a conventional method that is known in the art, and for example, the first adhesive may be coated by a known method such as roller printing. Here, the drying conditions of the first adhesive are not particularly limited, and for example, the drying may be conducted at 40-60° C. for 1-10 min, and preferably at 50° C. for 2 min.

In addition, for the print release paper in step S12-b, a conventional print release paper that is known in the art may be used without limitation, and for example, the print release paper may have a first surface having predetermined transfer patterns and/or colors and a second surface having a release layer.

In step S12-*b*, the forming conditions of the print layer through transfer are not particularly limited, but for examples, the print layer may be transferred by performing pressing, preferably, for 1-30 min under the conditions of a pressure of 3-6 kgf/m$^2$ and a temperature of 40-60° C., and more preferably, for 2 min under the conditions of a pressure of 5 kgf/m$^2$ and a temperature of 50° C.

After that, the transferred resultant material is first dried, and second, subjected to an aging process at 70-90° C. for 5-30 hours, and then the release paper is removed. Through the aging process in these temperature and time ranges, various patterns and colors of the print release paper can be favorably transferred to the polyurethane synthetic leather, and the strong binding between the print layer and the polyurethane synthetic leather can be formed.

(3) Step of Forming Second Adhesive Layer (Hereinafter, "Step S13")

If necessary, a second adhesive layer may be formed by coating a second adhesive composition on the polyurethane synthetic leather or the print layer, followed by drying.

The adhesive composition for forming the second adhesive layer and the coating method using the adhesive composition may be applied in the same manner as in step S12-*a*, but are not particularly limited thereto.

(4) Step of Forming Surface Reinforcement Layer (Hereinafter, Referred to as "Step S14")

If necessary, a surface reinforcement layer may be formed by disposing a surface reinforcement film on the second adhesive layer, followed by bonding.

Here, the completely dried second adhesive layer may cause a deterioration in the adhesion with the surface reinforcement film, and thus, preferably, the second adhesive layer is semi-dried and has a partially wet surface.

After that, first, the second adhesive layer and the surface reinforcement film, while being bonded to each other, are dried, and then second, subjected to an aging process at 70-90° C. for 5-30 hours. Through the aging process in these temperature and time ranges, the surface reinforcement layer and the polyurethane synthetic leather can be firmly bonded to each other.

(5) Step of Forming Silane-Based Coating Layer (Hereinafter, "Step S20")

In step S20, a silane-based coating layer is formed by coating a silane-based coating composition on the polyurethane synthetic leather, followed by drying.

Here, in cases where steps S11-S12 and/or steps S13-S14 are first performed, the silane-based coating layer is formed by coating the silane-based coating composition on the print layer or the surface reinforcement layer, followed by drying.

The silane-based coating composition according to the present invention may be a liquid composition containing: a modified alkylalkoxysilane selected depending on the substrate material; and an organic solvent, and further containing a cross-linking agent.

In step S20, as a preferable example, the silane-based coating composition may contain: on the basis of 100 parts by weight of the composition, 6-16 parts by weight of a $C_1$-$C_{10}$ modified alkylalkoxysilane; and the balance organic solvent to satisfy a total of 100 parts by weight of the composition, and if necessary, may further contain a conventional cross-linking agent that is known in the art.

In step S20, the method of coating the silane-based coating composition is not particularly limited, and a conventional coating method that is known in the art may be employed. For example, the printing may be conducted by at least one method selected from the group consisting of spin coating, dip coating, solvent casting, slot die coating, spray coating, knife coating, and gravure coating, and preferably gravure coating.

In cases where the silane-based coating layer is formed by gravure coating, the coating method, coating conditions, and drying conditions may be implemented by a conventional method that is known in the art. For example, the coating may be conducted using a roll-to-roll printer enabling gravure print coating.

Here, the coating amount for the silane-based coating composition may be in the range of 20-30 g/m$^2$, and preferably 25-30 g/m$^2$. Here, the drying conditions of the silane-based coating composition are not particularly limited. For example, the drying may be conducted at 50-70° C. for 1-10 min, and preferably at 60° C. for 2-5 min.

(6) Step of Forming Silicone Coating Layer (Hereinafter, "Step S30")

In step S30, a silicone coating layer is formed by coating a silicone coating composition on the formed silane-based coating layer, followed by drying.

The silicone coating composition that can be used herein may be a two-component composition containing: a main agent obtained by blending a linear siloxane, at least one cyclic siloxane, a siloxane-based copolymer, a silicone oil, and inorganic particles, in an organic solvent; and a curing agent containing a metallic catalyst and an organic solvent.

More specifically, the silicone coating composition may have a composition in which a main agent is mixed with a curing agent, the main agent containing: 10-20 parts by weight of a linear siloxane; 25-37 parts by weight of at least one cyclic siloxane; 2-5 parts by weight of a siloxane-based copolymer; 0.1-2 parts by weight of a silicone oil; 1-5 parts by weight of inorganic particles; and the balance organic solvent to satisfy a total of 100 parts by weight of the main agent, the curing agent containing: 60-80 parts by weight of a metallic catalyst; and the balance organic solvent to satisfy a total of 100 parts by weight of the curing agent.

Here, the metallic catalyst is a curing catalyst containing a metal, and an example of the metal may be at least one selected from the group consisting of manganese acetylacetonate, iron acetylacetonate, dibutyltin dilaurate, dibutyltin diacetate, copper (II) acetylacetonate, zinc octanate, zirconium naphthalate, and tetrabutyl titanate, and preferably dibutyltin dilaurate.

The viscosity of the homogeneously mixed silicone coating composition is not particularly limited, but for example, the viscosity thereof is preferably 200-1,000 cps/25° C.

In step S30, the method of coating the silicone coating composition is not particularly limited, and a conventional coating method that is known in the art may be employed. For example, the printing may be conducted by at least one method selected from the group consisting of spin coating, dip coating, solvent casting, slot die coating, spray coating, knife coating, and gravure coating, and preferably gravure coating.

In cases where the silicone coating layer is formed by gravure coating, the coating method, coating conditions, and drying conditions may be implemented by a conventional method that is known in the art. For example, the coating may be conducted using a roll-to-roll printer enabling gravure print coating.

Here, the coating amount for the silicone coating composition may be in the range of 20-50 g/m$^2$, and preferably 30-50 g/m$^2$.

The coated silicone coating layer is subjected to a dry process, and here, the drying conditions are not particularly limited. For example, first, the drying is conducted at 60-75° C. for 1-10 min, and preferably at 70° C. for 2-5 min, to remove the organic solvent, and then, second, the dried silicone coating layer is subjected to an aging step at 70-90° C. for 24-30 hours.

(7) Emboss-Processing Step (Hereinafter, "Step S40")

If necessary, the present invention may further include a step of emboss-processing a surface of the dried silicone coating layer.

Here, the emboss-processing conditions are not particularly limited, and the emboss-processing may be conducted by a conventional method that is known in the art.

The stain-resistant synthetic leather of the present invention manufactured as described above can be applied to various interior or exterior products. The interior products can be applied to all products to which the stain-resistant and water-resistant synthetic leather of the present invention can be introduced, and non-limited examples thereof may include wallpaper, furniture, flooring, interior materials, exterior materials, surface materials, wood, and interior accessories.

Hereinafter, examples of the present invention will be described in detail. However, these examples are given for specifically illustrating the present invention, and the scope of the present invention is not limited thereto.

Example 1: Manufacturing of Stain-Resistant Synthetic Leather (1)

A polyurethane coating composition (viscosity: 5000-7000 cps) containing a polyurethane resin with a molecular weight of 20,000-200,000 and an organic solvent having dimethyl formamide (DMF) and methyl ethyl ketone (MEK) mixed with each other was coated on a polyester fabric at a coating amount of 100 g/m$^2$ in terms of the solid content. The drying was conducted at 140-180° C. for 1-5 min, thereby forming a polyurethane coating layer. Here, the polyurethane coating composition in the dry process contained: 40 wt % of a polyurethane resin (polyurethane solids 30% and solvent 70%); 50 wt % of a solvent (DMF 100%); and 10 wt % (solids 50% and solvent 50%) of other ingredients including pigments.

Thereafter, a two-component polyurethane adhesive composition was coated at 40 g/m$^2$ on the polyurethane synthetic leather (fabric having a polyurethane coating layer), and then dried. Here, the composition and contents of the first adhesive composition are shown in Table 1.

While the first adhesive composition is semi-dried, a print release paper having transfer patterns is disposed thereon, followed by pressing for 2 min under the conditions of a pressure of 5 kgf/m$^2$ and a temperature of 50° C., thereby transferring the print layer having transfer patterns. The transferred resultant material was aged at 70-90° C. for 5-30 hours, and then the release paper was removed.

A two-component polyurethane adhesive composition was coated at 40 g/m$^2$ on the print layer of the polyurethane synthetic leather, followed by drying. Here, the composition and contents of the second adhesive composition are shown in Table 1.

While the second adhesive composition was semi-dried, a PET film (HANJO Industrial, matte) as a surface reinforcement layer was disposed thereon, followed by pressing for 2 min under the conditions of a pressure of 6.5 kgf/m$^2$ and a temperature of 50° C.

The silane-based coating composition is gravure-coated at 25 g/m$^2$ on the surface reinforcement layer of the polyurethane synthetic leather, followed by drying. Here, the composition and contents of the silane-based coating composition are shown in Table 1.

Then, a silicone coating composition is gravure-coated at 40 g/m$^2$ on the coated silane-based coating layer, followed by drying and then emboss-processing, thereby manufacturing a stain-resistant synthetic leather. The structure of the finally manufactured stain-resistant synthetic leather is shown in FIG. 5.

Example 2: Manufacturing of Stain-Resistant Synthetic Leather (2)

Solid type stain-resistant synthetic leather (2) was manufactured by the same method as in example 1, except that a silane-based coating layer and a silicone coating layer were sequentially formed on a polyurethane synthetic leather, without conducting steps of forming a first adhesive layer, a print layer, a second adhesive layer, and a surface reinforcement layer. The structure of the finally manufactured stain-resistant synthetic leather is shown in FIG. 1.

Example 3: Manufacturing of Stain-Resistant Synthetic Leather (3)

Stain-resistant synthetic leather (3) was manufactured by the same method as in example 1, except that a first adhesive layer, a print layer, a silane-based coating layer, and a silicone coating layer were sequentially formed on a polyurethane synthetic leather, without conducting steps of forming a second adhesive layer and a surface reinforcement layer. The structure of the finally manufactured stain-resistant synthetic leather is shown in FIG. 3.

Example 4: Manufacturing of Stain-Resistant Synthetic Leather (4)

Stain-resistant synthetic leather (4) was manufactured by the same method as in example 1, except that a second adhesive layer, a surface reinforcement layer, a silane-based coating layer, and a silicone coating layer were sequentially formed on a polyurethane synthetic leather, without conducting steps of forming a first adhesive layer and a print layer. The structure of the finally manufactured stain-resistant synthetic leather is shown in FIG. 4.

Example 5: Manufacturing of Stain-Resistant Synthetic Leather (5)

Stain-resistant synthetic leather (5) was manufactured by the same method as in example 1, except that a print layer, a silane-based coating layer, and a silicone coating layer were sequentially formed on a polyurethane synthetic leather, without conducting steps of forming a first adhesive layer, a second adhesive layer and a surface reinforcement layer; and the print layer was formed by directly coating a colorant composition containing pigments on the polyurethane synthetic leather, followed by drying. The structure of the finally manufactured stain-resistant synthetic leather is shown in FIG. 2.

TABLE 1

| Working order | Composition | Content (wt %) | Coating amount in terms of solid content (g/m²) | Working conditions (Time/° C.) | Coating method |
|---|---|---|---|---|---|
| 1 Poly-urethane coating | Polyurethane resin<br>Solvent and other ingredients | 40<br>60 | 100 | 140-180° C., 1-5 min | Release paper knife coating |
| 2 First adhesive coating | Two-component polyurethane adhesive composition | | 40 | Chamber temperature: 50° C., 2 min | Gravure knife coating |
| 3 Print release paper transferring | | | | Press pressure: 5 kgf/cm² | |
| 4 Second adhesive coating | Two-component polyurethane adhesive composition | | 40 | 50° C., 2 min | Gravure knife coating |
| 5 Surface reinforcement layer | | | | | |
| 6 Silane-based material coating | Ethyl acetate<br>Methyl alcohol<br>Modified methyltrimethoxysilane | 75~85<br>1~3<br>6~16 | 25 | 50° C., 2 min | Gravure coating |
| 7 Silicone coating | Octamethyl cyclotetrasiloxane<br>Decamethyl cyclotetrasiloxane<br>Polydimethyl siloxane<br>Siloxane-based copolymer<br>Silicone oil<br>Silica<br>Methylcyclohexane<br>Dibutyltin dilaurate<br>Isopropyl alcohol | 0.2~1.2<br>25~35<br>10~20<br>2~3<br>0.2~1.2<br>1~2<br>40~50<br>65~75<br>20~30 | 40 | Drying: 70° C., 2 min<br>Aging: Aging room, 80° C., 48 h | Gravure coating |
| 8 Embossing | | | | | |

The coating amounts are based on the amounts that are applied to a 1 m² fabric, and may be appropriately changed depending on the weight of the fabric.

TABLE 2

| | Ingredient | Manufacturer/ Model name (CAS No.) | Manufacturer/ Model name (CAS No.) |
|---|---|---|---|
| 1 Polyurethane coating | Polyurethane resin<br>Solvent (DMF)<br>Solvent (MEK) | ISU-409<br>68-12-2<br>78-93-3 | Ilsam<br>Daewon Chemical<br>Daewon Chemical |
| 2 First adhesive coating | Two-component polyurethane adhesive composition | 6200 | Jinsan Chemical |
| 3 Second adhesive coating | Two-component polyurethane adhesive composition | 6200 | Jinsan Chemical |
| 4 Silane-based material coating | Ethyl acetate<br>Methyl alcohol<br>Modified methyltrimethoxysilane | 141-78-6<br>67-56-1<br>2530-85-0 | ESFCT Inc. |
| 5 Silicone coating (Main agent) | Octamethyl cyclochlorotetrasiloxane<br>Decamethyl cyclotetrasiloxane<br>Polydimethylsiloxane<br>Siloxane-based copolymer (methylhydrosiloxane-dimethylsiloxane copolymer) | 556-67-2<br>541-02-6<br>70131-67-8<br>68037-59-2 | ESFCT Inc. |
| Silicone coating (Curing agent) | Silicone oil (dimethylsiloxane/water emulsion)<br>Silica<br>Methylcyclohexane<br>Dibutyltin dilaurate<br>Isopropyl alcohol | 63148-62-9<br>7631-86-9<br>108-87-2<br>77-58-7<br>67-63-0 | |

Test Example 1: Evaluation of Physical Properties of Stain-Resistant Synthetic Leather (1) Evaluation of Stain Resistance Evaluation of stain resistance was performed using the stain-resistant synthetic leathers manufactured in examples 1 and 2.

The evaluation was repeatedly performed 50 times using the same stain sources to evaluate the staining degree for each source by naked eyes. Here, an oil-based ballpoint pen, mustard, and ketchup, which are the most difficult to resist, were used as the stain sources.

As test results, on the stain-resistant synthetic leathers of examples 1 and 2, the marks of the ballpoint pen were easily removed by an eraser, fabric/paper towel, and the like, without using any particular cleaner (see FIGS. 6(a) to 9(b)).

Also, on the stain-resistant synthetic leathers of examples 1 and 2, the marks of the mustard or ketchup were cleanly removed, leaving no stains, by fabric/paper towel, without using any particular cleaner (see FIGS. 10(a) to 14).

Therefore, the stain-resistant synthetic leathers of the present invention had a significantly excellent stain-resistant effect.

(2) Evaluation of Water Resistance

Evaluation of water resistance was performed using the stain-resistant synthetic leathers manufactured in examples 1 and 2.

For evaluation, coffee was dropped on the stain-resistant synthetic leather to evaluate the shape or absorption degree of the dropped coffee by naked eyes. Here, the coffee was used as a material for evaluating water resistance since it has a more favorable permeation effect than water.

Figure 15:
FIGS. 15 and 16 are images illustrating evaluation results of water resistance (to coffee) of the stain-resistant synthetic leathers of the present invention.
Figure 16:
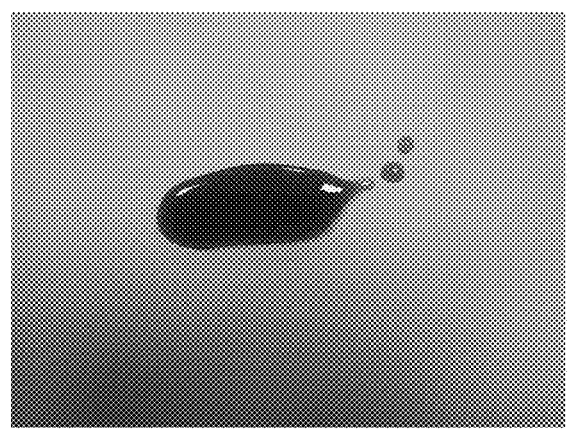

As test results, the coffee dropped on the stain-resistant synthetic leathers of examples 1 and 2 maintained its shape even with the passage of time, and was not absorbed into the stain-resistant synthetic leathers. Therefore, it could be seen that the stain-resistant synthetic leathers of the present invention have an excellent water-resistance effect (see FIGS. 15 and 16).

(3) Evaluation of Wear Resistance (Friction Fastness)

The stain-resistant synthetic leathers of examples 1 and 2 were tested according to ASTM D 4157-13, "Standard Test Method for Abrasion Resistance of Textile Fabrics (Oscillatory Cylinder Method)".

Generally, if the wear resistance test result shows 30,000 rubs or more, a synthetic leather is indicated as heavy duty, and if the wear resistance test result shows 50,000 rubs or more, the synthetic leather is determined to be commercially suitable.

The stain-resistant synthetic leather prepared through transfer printing of example 1 exceeded 200,000 rubs. The solid type stain-resistant synthetic leather product of example 2 exceeded 1,000,000 rubs (see Table 3).

TABLE 3

| Test Results | |
|---|---|
| Example 1 | Passed 200,000 Cycles |
| Example 2 | Passed 1,000,000 Cycles |
| | Abradant: #10 cotton duck; |
| | tension: 4 lb |
| | load: 3 lb |

(4) Evaluation of Cleaner Resistance

Various kinds of cleaners have been used for commercial and hospitals, and thus the durability against these cleaners is a very important characteristic that is required by products.

AATCC test was performed 10 times using 10 kinds of cleaners, which are mainly used as cleaners for hospitals. Here, the evaluation criteria and evaluation results of the cleaner resistance are shown in table 4 and 5.

As test results, both of the stain-resistant synthetic leathers of examples 1 and 2 showed significant results (see Table 5).

TABLE 4

| AATCC test 130 (Stain Release) | |
|---|---|
| 5-grade (ISO 5) | No color change (best cleaner-resistant characteristics) |
| 4-grade (ISO 4) | Slight color change (slight) |
| 3-grade (ISO 3) | Moderate color change (moderate) |
| 2-grade (ISO 2) | Considerable color change (considerable) |
| 1-grade (ISO 1) | Excessive color change (excessive) |

TABLE 5

| Cleaner for hospitals | Color change grade | Observation |
|---|---|---|
| Colorex Germicidal Wipes | 5 | No change |
| PDI Sani Super Wipes | 5 | No change |
| PDI Sani Plus Wipes | 5 | No change |
| PDI Sani Bleach | 5 | No change |
| Johnson Diversey Virex II 256 | 5 | No change |
| Virex TB | 5 | No change |
| 3M HB Quat | 5 | No change |
| WexCide 128 | 5 | No change |
| Accel TB | 5 | No change |
| Amphyl | 5 | No change |

What is claimed is:

1. A stain-resistant synthetic leather, comprising:
   (a) a polyurethane synthetic leather;
   (b) a silane-based coating layer formed on the polyurethane synthetic leather; and
   (c) a silicone coating layer formed on the silane-based coating layer, wherein the silane-based layer strengthens the binding between the polyurethane synthetic leather and the silicone coating layer,
   which further comprises, between (a) the polyurethane synthetic leather and (b) the silane-based coating layer,
   (f) a second adhesive layer; and
   (g) a surface reinforcement layer for reinforcing mechanical strength of the synthetic leather, formed on the second adhesive layer.

2. The stain-resistant synthetic leather of claim 1, wherein
   (a) the polyurethane synthetic leather comprises:
   (a-1) a fabric layer forming a leather substrate; and
   (a-2) a polyurethane coating layer formed on one surface or both surfaces of the fabric layer.

3. The stain-resistant synthetic leather of claim 1, further comprising:
   (d) a print layer formed between (a) the polyurethane synthetic leather and (b) the silane-based coating layer, the print layer having a predetermined color or pattern.

4. The stain-resistant synthetic leather of claim 3, further comprising:
   (e) a first adhesive layer for enhancing adhesive strength, formed between (a) the polyurethane synthetic leather and (d) the print layer.

5. The stain-resistant synthetic leather of claim 1, wherein (b) the silane-based coating layer is formed by cross-linkage of a $C_1$-$C_{10}$ modified alkylalkoxysilane.

6. The stain-resistant synthetic leather of claim 1, wherein the coating amount of (b) the silane-based coating layer is in the range of 20-30 g/m$^2$.

7. The stain-resistant synthetic leather of claim 1, wherein (c) the silicone coating layer comprises: a linear siloxane; at least one cyclic siloxane; a siloxane-based copolymer; an emulsion of dimethylpolysiloxane and water; and inorganic particles.

8. The stain-resistant synthetic leather of claim 1, wherein the coating amount of (c) the silicone coating layer is in the range of 20-50 g/m$^2$.

9. The stain-resistant synthetic leather of claim 1, wherein an embossing pattern having a plurality of concave portions and convex portions is formed on a surface of the stain-resistant synthetic leather.

10. A method for manufacturing the stain-resistant synthetic leather of claim 1, the method comprising:
    (i) preparing a polyurethane synthetic leather;
    (ii) forming a silane-based coating layer by coating a silane-based coating composition on one surface or both surfaces of the polyurethane synthetic leather, followed by drying; and
    (iii) forming a silicone coating layer by coating a silicone coating composition on the silane-based coating layer, followed by drying,
    which comprises between steps (i) and (ii),
    (i-4) forming a second adhesive layer on one surface of the polyurethane synthetic leather by coating and drying a second adhesive coating composition; and
    (i-5) arranging a surface reinforcement film on the semi-dried second adhesive layer.

11. The method of claim 10, wherein the silane-based coating composition in step (ii) contains: on the basis of 100 parts by weight of the corresponding composition, 6-16 parts by weight of a $C_1$-$C_{10}$ modified alkylalkoxysilane; and the balance organic solvent to satisfy a total of 100 parts by weight of the composition.

12. The method of claim 10, wherein the silicone coating composition in step (iii) is a two-component composition containing: a main agent obtained by blending a linear siloxane, at least one cyclic siloxane, a siloxane-based copolymer, a silicone oil, and inorganic particles, in an organic solvent; and
    a curing agent containing a metallic catalyst and an organic solvent.

13. The method of claim 10, wherein the drying in step (iii) comprises:
- a first step of conducting drying at 60-75° C. for 1-10 min; and
- a second step of conducting aging at 70-90° C. for 24-30 hours.

14. The method of claim 10, further comprising:
between steps (i) and (ii),
- (i-1) forming a print layer having a predetermined color or pattern on the polyurethane synthetic leather by coating and drying a composition for forming a print layer.

15. The method of claim 10, further comprising:
between steps (i) and (ii),
- (i-2) forming a first adhesive layer on one surface of the polyurethane synthetic leather by coating and drying a first adhesive coating composition; and
- (i-3), while the first adhesive layer is semi-dried, arranging a print release paper having a transfer pattern on the semi-dried first adhesive layer, followed by compressing under a predetermined pressure and temperature, thereby transferring the print layer, and then removing the release paper.

16. The method of claim 10, further comprising:
after step (iii),
- (iv) emboss-processing a surface of the dried silicone coating layer.

* * * * *